з,600,383
Patented Aug. 17, 1971

3,600,383
OXADIAZOLE COMPOUNDS
John Reginald Atkinson and Eric Hemingway, Manchester, England, assignors to Imperial Chemical Industries Limited, London, England
No Drawing. Filed July 29, 1968, Ser. No. 748,171
Claims priority, application Great Britain, Aug. 15, 1967, 37,407/67
Int. Cl. C07d 85/54
U.S. Cl. 260—240                1 Claim

ABSTRACT OF THE DISCLOSURE

Substituted mono- or bis-1,3,4-oxadiazoles in which at least one substituent is a polycyclic aromatic hydrocarbon group having at least three fused rings, a process for their manufacture and their use as fluorescent brightening agents for polymeric materials.

This invention relates to new oxadiazole compounds and more particularly to 1,3,4-oxadiazole compounds having certain polycyclic aromatic hydrocarbon substituents, and the use of these compounds as fluorescent brightening agents.

According to the present invention there are provided 1,3,4-oxadiazole compounds having the general formula:

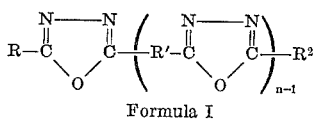

Formula I wherein

R represents a polycyclic aromatic hydrocarbon group having at least 3 fused rings;

R' represents a divalent alkylene, arylene or heterocyclic group;

$R^2$ represents a polycyclic aromatic hydrocarbon group having at least 3 fused rings and which may be the same as or different from the group represented by R, a hydrogen atom, an alkyl, substituted alkyl, cycloalkyl, aralkyl, optionally substituted mono- or bicyclic aryl, alkenylaryl, or an optionally subsituted mono- or bicyclic heterocyclic group, and n is 1 or 2.

As examples of polycyclic aromatic hydrocarbon groups represented by R and $R^2$ there may be mentioned pyrene, acenaphthene, anthracene, phenanthrene, fluorene and chrysene, which may optionally carry non-chromophoric substituents.

As examples of alkyl groups represented by $R^2$ there may be mentioned methyl, ethyl, propyl and butyl groups. As substituted alkyl groups there may be mentioned 2-chloroethyl, chloromethyl, 2-hydroxyethyl, 2-methoxyethyl, and 2-acetoxyethyl.

As examples of cycloalkyl and aralkyl groups represented by $R^2$ there may be mentioned cyclohexyl, benzyl and β-phenylethyl groups, and as an example of an alkenylaryl group there may be mentioned styrene.

As examples of aryl groups represented by $R^2$ there may be mentioned phenyl, diphenyl and naphthyl groups. As substituted aryl groups there may be mentioned 4-methylphenyl, 4-methoxyphenyl, 4-chlorophenyl, 4-tertiary butylphenyl, 4-methoxycarbonylphenyl, 4-ethoxycarbonylphenyl, 3-chlorophenyl, 3-methylphenyl, 3-methoxyphenyl, 2,4-dichlorophenyl and 4-methoxynaphth-1-yl.

As examples of heterocyclic groups represented by $R^2$ there may be mentioned furyl, thienyl, pyrrolyl, pyridinyl, pyrimidinyl, benzoxazol-2-yl, benzthiazol-2-yl and benzimidazol-2-yl; and as substituted heterocyclic groups there may be mentioned 5-phenylfur-2-yl, 5-methylfur-2-yl, 5-methoxycarbonylfur-2-yl, 2-chlorofur-2-yl, 3-isopropylfur-2-yl, 5-chlorothien-2-yl, 6-methylpyrid-2-yl and 4-chloropyrid-2-yl.

As examples of divalent alkylene, arylene and heterocyclic groups represented by R' there may be mentioned ethylene, phenylene, diphenylene, stilbenylene, furenylene and thienylene.

According to a further feature of the invention there is provided a process for the manufacture of 1,3,4-oxadiazoles of Formula I which comprises the simultaneous dehydration and ring closure of a compound having the formula:

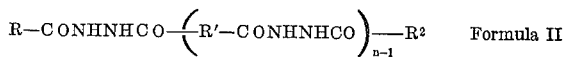           Formula II wherein R, R', $R^2$ and n have the meanings stated above.

The ring closure may be brought about either by the action of heat or by the use of a dehydrating agent. Suitable dehydrating agents are thionyl chloride, acetic anhydride, phosphorus trichloride, phosphorus oxychloride, phosphorus pentoxide, phosphoric acid, polyphosphoric acid, phosphorus pentachloride, zinc chloride and aluminium chloride, which may be used alone or in conjunction with an inert solvent such as benzene, toluene, monochlorobenzene, or nitro benzene.

The compounds of Formula II may themselves be obtained, in the case where n=1, by the reaction of a carboxylic acid chloride of the formula R.COCl with hydrazine to give the monohydrazide R.CONHNH$_2$, which is then further reacted with a second carboxylic acid chloride $R^2$.COCl to give the N,N'-disubstituted hydrazide R.CONHNHCOR$^2$. The same acid chloride may be used in both stages of the reaction so that a symmetrical disubstituted hydrazide is obtained. The same product may of course be obtained by first reacting the acid chloride $R^2$.COCl with hydrazine to give the hydrazide $R^2$.CONHNH$_2$ which is then further reacted with the acid chloride R.COCl.

In the case when n=2, symmetrical compounds of Formula I wherein R=$R^2$ may be obtained by reacting a bis-acid chloride of the formula R'(COCl)$_2$ with 2 mols of a hydrazide of the formula R.CONHNH$_2$ to give the dihydrazide

The alternative route wherein the bis-acid chloride is first converted into the bis-hydrazide

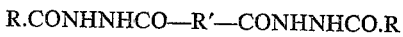

which is then condensed with 2 mols of the acid chloride R.COCl may be used. A double ring closure then gives the bis-oxadiazole.

Compounds of Formula I wherein R and $R^2$ are different may be obtained by reaction of a hydrazide of the formula R.CONHNH$_2$ with a carboxylic acid chloride of the formula ClCO—R'—Z where Z represents a group which is convertible into a carboxylic acid chloride group, to give the N,N'-disubstituted hydrazide having the formula R.CONHNHCO—R'—Z. This compound may, if desired, and depending upon the nature of the group Z, also be obtained by reacting the acid chloride ClCO—R'—Z with hydrazine to give the hydrazide H₂NNHCO—R'—Z, which is subsequently condensed with the acid chloride R.COCl. The compound of formula

R.CONHNHCO—R'—Z may then be ring closed to give the oxadiazole of formula

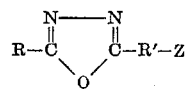

followed by the necessary reaction steps to convert the group Z into a carboxylic acid chloride group. The oxadiazole carboxylic acid chloride so obtained is then reacted either (a) with hydrazine to give the hydrazide, followed by condensation with an acid chloride of the formula R².COCl or (b) with a hydrazide of the formula R².CONHNH₂, to give an oxadiazole of the formula:

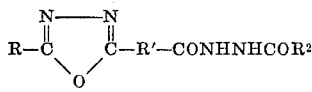

A second ring closure then gives the unsymmetrical bis-oxadiazole.

As examples of groups Z which are convertible into carboxylic acid chloride groups there may be mentioned carboxylic ester groups and alkyl, preferably methyl groups. The former are converted to carboxylic acid groups by hydrolysis and the latter by oxidation. The carboxylic acid group may then be converted to the acid chloride by standard methods, for example, by reaction with thionyl chloride.

A mixture of oxadiazoles of Formula I may be obtained by condensation of a bis-acid chloride of Formula R'(COCl)₂ with a mixture of two different hydrazides R·CONHNH₂ and R²·CONHNH₂ or firstly with one hydrazide and then with the second hydrazide. Alternatively, the bis-hydrazide H₂NNHCO—R'—CONHNH₂ may be condensed concurrently or consecutively with two different acid chlorides, R·COCl and R²·COCl.

In this way a mixture of all three possible reaction products of Formula II,

R·CONHNHCO—R'—CONHNHCO·R

R²·CONHNHCO—R'—CONHNHCO·R² and

R·CONHNHCO—R'—CONHNHCO·R² is obtained. Subsequent ring closure gives a mixture of the corresponding three oxadiazoles.

The preparation of mono-substituted hydrazides from acid chlorides and hydrazine in the presence of an acid-binding agent may be carried out in aqueous medium or, in an organic solvent or in a mixture of water and water-miscible organic solvent. Examples of suitable solvents are ethanol, benzene, toluene, monochlorobenzene, and pyridine.

An excess of hydrazine may be used as the acid-binding agent, or an inorganic compound, for example, sodium bicarbonate, sodium carbonate or sodium hydroxide, may be used.

The hydrazine is preferably used in the form of its hydrate.

Preparation of the N,N'-disubstituted hydrazides from the mono-substituted hydrazide and an acid chloride may be carried out in an organic solvent in the presence of an acid-binding agent. There may conveniently be used a solvent which is itself basic and which does not react with an acid chloride, for example, tertiary amines such as pyridine. Other solvents which may be used are benzene, toluene and monochlorobenzene.

The ring closure of N,N'-disubstituted hydrazides to the corresponding oxadiazoles may be carried out in the dehydrating agent as solvent, optionally diluted with other inert solvents.

According to a further feature of the invention there is provided a process for the brightening of polymeric materials by the incorporation into the said polymeric material of an oxadizole compound of the formula

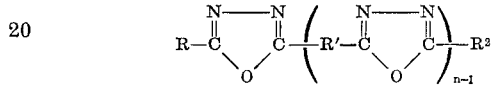

wherein R, R', R² and n have the meanings stated above.

Mixtures of oxadiazole compounds having the above formula may be used, for example, mixtures prepared by the process hereinbefore described.

Polymeric materials which may be brightened by the process of the invention include synthetic polymeric materials, for example polyamides such as polyhexamethylene adipamide and polycaprolactam, polyesters such as polyethylene terephthalate, polyurethanes, acrylonitrile polymers and copolymers and hydrolysed polyacrylonitriles, polymethyl methacrylate, polystyrene, polyethylene, polypropylene, artificial polymers for example secondary cellulose acetate, cellulose triacetate and regenerated cellulose such as viscose, and natural polymers for example cellulose such as cotton and paper, silk and wool.

The preferred method of incorporating the oxidazole compounds of the invention into the polymeric material, particularly when the polymeric material is a synthetic or artificial polymer in the form of a textile material is by treating the polymeric material with an aqueous dispersion of the oxadiazole compound. Such dispersions may be obtained by milling the oxadiazole compound in water containing a suitable dispersing agent, for example, disodium dinaphthylmethane disulphonate.

The aqueous dispersion is preferably substantially neutral, or slightly alkaline, but acid conditions may be employed if desired although not usually so effective. The use of substantially neutral suspensions in the process of the invention permits these brightening agents to be applied to textile materials at the same time as dispersed dyestuffs this providing dyeings of brighter shade.

The temperature of application should be at least 40° C. In the case of secondary cellulose acetate the temperature is desirably about 85° C. since use of higher temperatures may soften the material, but with polyamides, cellulose triacetate, acrylonitrile polymers and copolymers and polyesters it is convenient to treat the polymeric material at the boiling point, about 95° C. to 100° C., of the aqueous suspension. Subject to any limitation imposed by the heat stability of the polymeric material higher temperatures, for example up to 140° C. under superatmospheric pressure if necessary, may be used.

Another method of application, of particular value with synthetic polymeric materials such as polyethylene terephthalate, is to impregnate the fabric with an aqueous suspension of the oxadiazole compound by padding, preferably at room temperature, and then drying the fabric by heating in air at a temperature between 150° C. and 200° C., and preferably at about 180° C. for a short period, preferably between 20 and 30 seconds.

Surface-active agents, for example fatty alcohol-ethylene oxide condensates or sulphonated alkylnaphthalenes may be added with advantage, and it is in many cases convenient to disperse the oxadiazole compound in a soap or detergent, which is then used to wash and brighten simultaneously the textile material from an aqueous medium. The incorporation of these compounds in soaps or detergents also improves the appearance of the soaps or detergents and this constitutes a further feature of the invention.

The oxadiazole compounds may be used in conjunction with other brightening agents, for example substituted 4:4'-ditriazinylaminostilbene - 2:2' - disulphonic acids, in order to increase the brightening effect on certain textile materials, for example cotton and wool when mixtures of textile materials are being treated.

Other methods of incorporating the oxadiazole compounds in the process of the invention may be used if desired. The oxadiazole compounds may for example be mixed with the polymer in the molten or plasticised form.

The invention is illustrated but not limited by the following examples in which the parts and percentages are by weight unless otherwise stated.

EXAMPLE 1

27.2 parts of benzoylhydrazide and 70 parts of pyridine are mixed and stirred at 20° C. and a benzene solution of the acid chloride prepared by treating 24.6 parts of pyrene-1-carboxylic acid with 11.9 parts of thionyl chloride is added during 30 minutes. The mixture is then warmed to 70° C., stirred at this temperature for 30 minutes and filtered. The residual white solid is washed with benzene and then with water and dried.

32 parts of material melting at 255–257° C. and of the following formula are obtained:

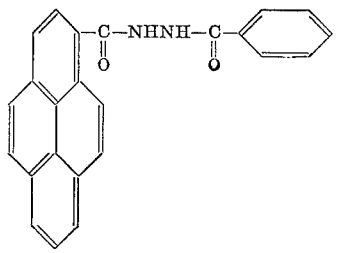

10 parts of the phenylpyrenylhydrazide so obtained and 50 parts of thionyl chloride are stirred and warmed to 76° C. and maintained at this temperature until the evolution of gases has ceased. The resulting solution is evaporated under reduced pressure and the residual yellow solid is triturated with cold water, washed acid-free and dried.

8.6 parts of 2-phenyl - 5 - pyren-1'-yl-1,3,4-oxadiazole of M.P. 160–4° C. are obtained. Recrystallisation from benzene gives material M.P. 172–3° C.

Found (percent): C, 82.4; H, 4.0; N, 8.2. $C_{24}H_{16}N_2O_2$ requires (percent): C, 83.2; H, 4.0; N. 8.1.

Solutions of the product in solvents such as acetone, benzene and chloroform show strong blue-violet fluorescence in daylight.

EXAMPLE 2

A benzene solution of the acid chloride prepared by reacting 24.6 parts of pyrene-1-carboxylic acid with 11.9 parts of thionyl chloride is added to a mixture of 200 parts of ethyl alcohol and 80 parts of hydrazine hydrate and the mixture is stirred for 30 minutes at 20° C., warmed to 70° C., and then cooled. The product is isolated by filtration, washed with ethyl alcohol and then with water and dried.

17.5 parts of white solid M.P. 224–4° C. are obtained. The product has the formula:

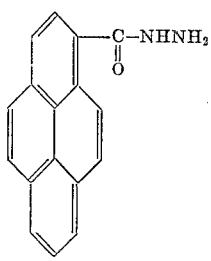

Found (percent): C, 78.1; H, 4.4; N, 10.7. $C_{17}H_{12}N_2O$ requires (percent): C, 78.5; H, 4.6; N, 10.7.

57 parts of the pyrenylhydrazide so obtained and 1,000 parts of pyridine are stirred at 10–15° C. and 26 parts of 2-furoylchloride are added during 15 minutes. The mixture is heated to 80° C. and maintained for 2 hours at this temperature. The clear solution is cooled and drowned into 1,000 parts of iced water. The precipitated solid is filtered off, water washed and dried. 68 parts of cream coloured solid melting at 227–30° C. are obtained. The product has the structure:

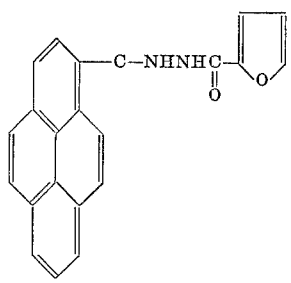

Found (percent): C, 74.2; H, 4.0; N, 7.9. $C_{22}H_{14}N_2O_3$ requires (percent): C, 74.5; H, 4.0; N, 7.9.

5 parts of the above material and 30 parts of thionyl chloride are stirred and warmed to 76° C. until the evolution of gases has ceased. The solution is evaporated to dryness under reduced pressure and the residual solid is triturated with water, washed acid free and dried. 4.7 parts of 2-furen-2'-yl-5-pyren - 1' ''-yl-1,3,4,-oxadiazole of M.P. 206–7° C. (after crystallisation from butanol) are obtained. Solutions in solvents such as acetone and chloroform exhibit strong blue fluorescence in daylight.

EXAMPLE 3

A mixture of 5.7 parts of pyrene monohydrazide prepared as in Example 2 and 100 parts of pyridine is stirred and treated with a benzene solution of the acid chloride prepared by treating 4.04 parts of 4-methoxy-1-naphthoic acid with 2.6 parts of thionychloride, and the mixture is warmed to 90° C. for 1 hour. After cooling, the mixture is filtered and the residual fawn coloured solid is washed with pyridine, then with water and dried.

6.7 parts of material M.P. 299–301° C. (decomp.) are obtained. The product has the following structure:

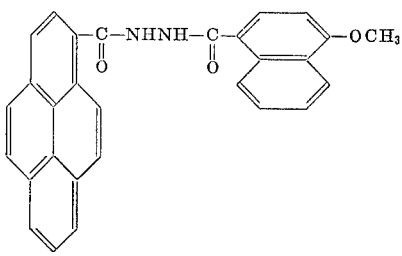

Found (percent): C, 77.8; H, 4.6; N, 6.3 $C_{29}H_{20}N_2O_3$ requires (percent); C, 78.5; H, 4.5; N, 6.3.

5 parts of the material so obtained and 30 parts of thionylchloride were mixed and the ring closure techniques described in Examples 1 and 2 were repeated to give 4.7 parts of 2-(4'-methoxynaphth-1'-yl)-5-pyren-1''-yl(1,3,4-oxadiazole, M.P. 248–9° C. (decomp.).

EXAMPLE 4

5.7 parts of pyrenemonohydrazide and 125 parts of pyridine are stirred and a benzene solution of the acid chloride from 4.9 parts of pyrene-1-carboxylic acid is added. The mixture is warmed to 80° C. and maintained at this temperature for 2 hours. After cooling, the product is isolated by filtration and washed with benzene, then with pyridine and finally with water, and dried.

7.4 parts of product melting at 318° C. (decomp.) are obtained and of structure shown:

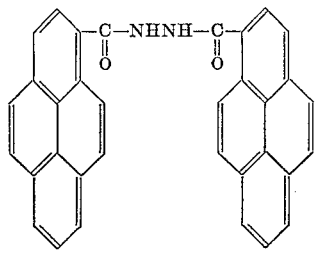

Found (percent): C, 82.9; H, 4.0; N, 5.9. $C_{34}H_{20}N_2O_2$ requires (percent): C, 83.5; H, 4.1; N, 5.7.

Ring closure of 5 parts of the bis-pyrenylhydrazide with thionyl chloride as described in Examples 1 and 2, or with acetic anhydride, gives 4.5 parts of 2,5-di(pyren-1'-yl)-1,3,4-oxadiazole as a reddish yellow powder melting at 305–7° C.

Found (percent): C, 85.3; H, 3.7; N, 6.0. $C_{34}H_{18}N_2O$ requires (percent): C, 86.7; H, 3.83; N, 5.96.

Solutions of the material in solvents such as chloroform, monochlorobenzene or dimethylformamide exhibit an intense greenish-blue fluorescence in daylight.

EXAMPLE 5

A dispersion is prepared by gravel milling 1 part of 2-phenyl - 5 - pyren - 1' - yl - 1,3,4 - oxadiazole in a solution of 1 part of dispersing agent in 100 parts of water until the particle size has been reduced to less than 5μ. 10 parts of the dispersion are added to a bath containing 400 parts of water and 10 parts of "Terylene" polyester fibre. The bath is warmed to 85–90° C. in 30 minutes and maintained at this temperature for 30 minutes. After rinsing and drying, the fabric is much whiter and brighter in appearance than the untreated fabric.

Polyamide and polyacrylonitrile fibres are similarly improved in whiteness after treating with the same fluorescent compound.

EXAMPLE 6

A dispersion is prepared by gravel milling 1 part of 2-furen - 2' - yl - 5 - pyren - 1" -yl - 1,3,4 - oxadiazole as described in Example 5. 10 parts of the dispersion so obtained are diluted to 400 parts with water and an anionic dispersing agent and 10 parts of polyacrylonitrile fabric are added. The temperature is raised to 85–90° C. for 30 minutes. After washing and rinsing the fabric is much whiter with a bluish tone than untreated fabric. Polyamide and cellulose triacetate fibres are similarly improved in whiteness by treating with the same fluorescent compound.

EXAMPLE 7

5 parts of the hydrazide prepared from pyrenemonohydrazide and 4-methoxy - 1 - naphthoic acid as described in Example 3 and 2 parts of polyphosphoric acid are mixed in 50 parts of monochlorobenzene and heated to 110° C. for 1 hour. After cooling, the solvent is decanted from the tarry deposit. Trituration with water yields a pale yellow solid which is isolated by filtration, washed with water and dried. 4 parts of 2-(4'-methoxynaphth-1-yl)-5-pyrene - 1" - yl - 1,3,4 - oxadiazole, M.P. 250–251° C. are obtained. Recrystallisation from monochlorobenzene gives material having M.P. 260° C. (Found (percent): C, 87.3; H, 4.3; N, 6.4. $C_{29}H_{18}O_2N_2$ requires (percent): C, 87.5; H, 4.3; N, 6.55.)

The following table illustrates further examples in which hydrazides of Formula I are prepared and converted into 1,3,4-oxadiazide compounds of Formula II by methods similar to those described in Examples 1 to 4 and 7 above.

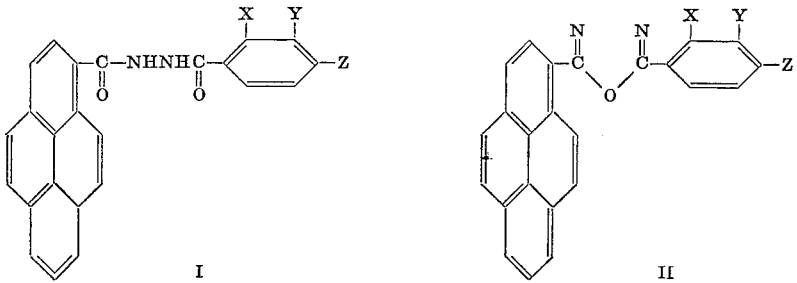

| Example Number | X | Y | Z | Analysis, percent Calculated | | | Analysis, percent Found | | | M.P., °C. | Yield, percent | Analysis, percent Calculated | | | Analysis, percent Found | | | M.P., °C. | Yield, percent |
|---|---|---|---|---|---|---|---|---|---|---|---|---|---|---|---|---|---|---|---|
| | | | | C | H | N | C | H | N | | | C | H | N | C | H | N | | |
| 8 | H | H | Cl | 72.3 | 3.8 | 7.0 | 71.8 | 3.6 | 6.9 | 295 | 69 | 75.6 | 3.4 | 7.3 | 75.5 | 3.3 | 7.3 | 195 | 78 |
| 9 | H | Cl | H | 72.3 | 3.8 | 7.0 | 70.9 | 3.8 | 6.8 | 281 | 71 | 75.6 | 3.4 | 7.3 | 75.8 | 3.5 | 7.5 | 160 | 52.6 |
| 10 | Cl | H | H | 72.3 | 3.8 | 7.0 | 70.4 | 3.7 | 7.2 | 243 | 74 | 75.6 | 3.4 | 7.3 | 75.9 | 3.3 | 7.5 | 197 | 43 |
| 11 | H | H | $CH_3$ | 79.3 | 4.7 | 7.4 | 78.6 | 4.8 | 7.1 | 275 | 83 | 83.4 | 4.4 | 7.8 | 83.7 | 4.4 | 7.8 | 184 | 73 |
| 12 | H | Cl | $CH_3$ | 79.3 | 4.7 | 7.4 | 77.6 | 4.9 | 7.6 | 222 | 89 | 83.4 | 4.4 | 7.8 | 83.0 | 4.3 | 7.8 | 185 | 40 |
| 13 | $CH_3$ | H | H | 79.3 | 4.7 | 7.4 | 78.5 | 4.8 | 7.4 | 250 | 77 | 83.4 | 4.4 | 7.8 | 82.6 | 4.3 | 7.9 | 193 | 30 |
| 14 | H | H | (¹) | 80.0 | 5.7 | 6.7 | 79.8 | 5.9 | 6.9 | 303 | 94 | 83.5 | 5.5 | 7.0 | 82.6 | 5.4 | 7.2 | 175 | 63 |
| 15 | H | H | $OCH_3$ | 76.1 | 4.5 | 7.1 | 75.3 | 4.3 | 7.0 | 251 | 60 | 79.1 | 4.2 | 7.6 | 81.1 | 4.0 | 7.6 | 213 | 32 |
| 16 | H | H | $C_6H_5$ | 81.8 | 4.5 | 6.4 | 81.0 | 4.2 | 6.2 | 280 | 72 | 86.0 | 4.0 | 6.7 | 85.9 | 4.4 | 6.9 | 203 | 47 |
| 17 | Cl | H | Cl | 66.5 | 3.2 | 6.4 | 64.2 | 3.3 | 6.9 | 278 | 52 | 79.5 | 4.7 | 7.4 | 78.6 | 4.8 | 7.4 | 250 | 73 |
| 18 | OH | H | H | 75.8 | 4.2 | 7.3 | 75.1 | 4.2 | 7.3 | 249 | 73 | 79.8 | 3.9 | 7.7 | 79.3 | 4.0 | 7.4 | 230 | 55 |

¹ Tertiary butyl.

EXAMPLE 19

0.1 part of 2-(pyren-1-yl)-5-(diphen-4-yl)-1,3,4-oxadiazole (Example 16), prepared by the method of Example 1, is dissolved in ethylene glycol, the solution is tumbled with "Terylene" chip, and the mixture is dried, melted, spun into filament and drawn into fibre. The fibre thus treated is much whiter in appearance than untreated fibre. Any of the compounds described in Examples 8–18 can be similarly applied to "Terylene" or nylon or can be applied by chip coating from chloroform or acetone solution prior to melting and extruding into filament.

EXAMPLE 20

4.8 parts of terephthalic hydrazide (NH$_2$NHCOC$_6$H$_4$CONHNH$_2$)

12.3 parts of pyrene-1-carboxylic acid and 100 parts of polyphosphoric acid are mixed and heated to 125° C. and maintained at this temperature for 6 hours. After cooling to 80° C., 150 parts of water are added cautiously and the mixture is stirred until cold. The precipitated yellow solid is isolated by filtration and dried.

There are thus obtained 12.3 parts of the compound 1,4-bis[(2 - pyren - 1 - yl) - 1,3,4 - oxadiazol - 5 - yl] benzene of M.P. >300° C. and which shows intense greenish-blue fluorescence in organic solvents.

EXAMPLE 21

11.1 parts of mixed phenanthrene-2-and -3-carboxylic acids, 250 parts of toluene, and 1 drop of pyridine are treated at 90° C. with 4.1 parts of thionyl chloride until the evolution of acid gases has ceased. The toluene solution is then added to a mixture of 8.2 parts of benzoylhydrazide and 5 parts of pyridine in 200 parts of toluene. The mixture is heated to 110° C. for 1 hour, and the tarry mass which is formed is isolated by filtration, dried, triturated with water and isolated by filtration and water washing.

There are thus obtained 12.6 parts of a mixture of compounds having the structure:

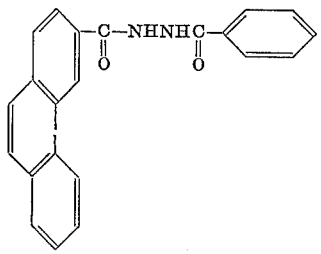

in which the phenanthrene nucleus is linked via the 2- or the 3-position. The melting point is 165–171° C. (Found (percent): C, 75.9; H, 4.7; N, 8.2. C$_{22}$H$_{16}$O$_2$N$_2$ requires (percent): C, 77.6; H, 5.0; N, 8.3.)

5 parts of the material so obtained are mixed with 30 parts of thionyl chloride and stirred at 75° C. until a clear solution results (about 30 minutes). The excess thionyl chloride is removed under reduced pressure. The residual solid is triturated with water and finally filtered, washed acid-free and dried.

There are thus obtained 4.5 parts of the mixture of compounds of structure

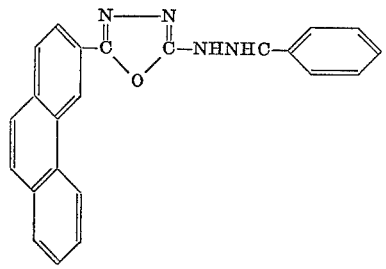

in which the phenanthrene nucleus is linked in either the 2- or 3-position. The mixture, after recrystallisation from n-propyl alcohol, melts over the range 166–170°C.

EXAMPLE 22

5.2 parts of pyrene hydrazide prepared as described in Example 2, 10 parts of pyridine and 100 parts of toluene are stirred and treated at 10–15° C. with 1.6 parts of acetyl chloride. The mixture is then heated at 75° C. for 1 hour, cooled and the product isolated by filtration, washed with petrol and dried. There are thus obtained 4.9 parts of product of formula

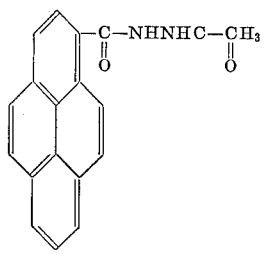

which melts at 260° C. (Found (percent): C, 74.2; H, 4.6; N, 9.3. C$_{19}$H$_{14}$O$_2$N$_2$ requires (percent): C, 75.5; H, 4.6; N, 9.3.)

The material so obtained is treated with 2.7 parts of thionylchloride in 100 parts of toluene at 90° C. for ½ hour. The solution is screened and diluted with petrol. The yellow-brown solid which separates is isolated by filtration. 1.2 parts of material of M.P. 181° C. is obtained which shows a strong blue fluoroescence which dissolved in organic solvents.

EXAMPLE 23

5 parts of pyrene hydrazide and 75 parts of ethyl orthoformate (H—C—(OEt)$_3$) are mixed and warmed to reflux at 102° C. Water and ethyl orthoformate are allowed to azeotrope until the temperature reaches 128° C. and heating at this temperature is continued for a further 18 hours. The mixture is cooled to 20° C. and the precipitated solid is isolated by filtration and recrystallised directly from 200 parts of toluene to give 3.7 parts of material of M.P. 188–9° C. having the structure

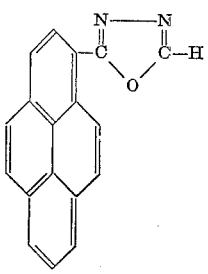

The following table illustrates further examples in which hydrazides of Formula I are prepared and connected into 1,3,4-oxadiazole compounds of Formula II by methods similar to those described above.

11

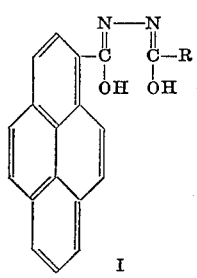

I

12

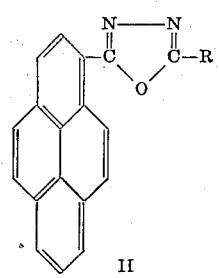

II

| Example Number | R | Analysis, percent Calculated C | H | N | Found C | H | N | M.P., °C. | Yield, percent | Calculated C | H | N | Found C | H | N | M.P., °C. | Yield, percent |
|---|---|---|---|---|---|---|---|---|---|---|---|---|---|---|---|---|---|
| 24 | (furyl-H) | 74.5 | 4.0 | 7.9 | 74.2 | 4.0 | 7.9 | 227 | 97.4 | 78.5 | 3.6 | 8.3 | 77.8 | 3.8 | 8.4 | 203 | 97 |
| 25 | (furyl-Br) | 61.0 | 3.0 | 6.5 | 60.6 | 3.2 | 6.2 | | 57 | 63.6 | 2.7 | 6.7 | 61.2 | 2.8 | 6.5 | 179 | 93 |
| 26 | (benzofuryl) | 77.2 | 4.0 | 6.9 | 75.6 | 4.0 | 7.0 | 237 | 78.8 | 80.7 | 3.6 | 7.2 | 80.1 | 3.9 | 7.5 | 197 | 96 |
| 27 | (naphthyl) | 81.1 | 4.3 | 6.8 | 79.3 | 4.3 | 7.0 | 266 | 77 | 84.9 | 4.0 | 7.1 | 85.1 | 4.1 | 6.8 | 228 | 67 |
| 28 | (acenaphthenyl) | 81.8 | 4.5 | 6.3 | 79 | 4.6 | 6.7 | >300 | 94 | 85.4 | 4.3 | 6.6 | 85 | 4.4 | 6.5 | 280 | 61 |
| 29 | —H=CH—phenyl | 80.0 | 4.6 | 7.2 | 78.8 | 4.5 | 7.1 | 282 | 90.5 | 83.9 | 4.3 | 7.5 | 84.4 | 4.1 | 7.5 | 170 | 50 |
| 30 | (fluorenyl) | 82.5 | 4.4 | 6.2 | 80.3 | 4.2 | 6.1 | 305–7 | 90 | 85.6 | 4.1 | 6.4 | 83.9 | 3.8 | 6.6 | 258 | 52 |

What we claim is:
1. A 1,3,4-oxadiazole compound having the formula:

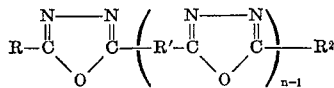

wherein R represents a pyrenyl radical;
R' represents a phenylene radical;
R² represents a member selected from the group consisting of hydrogen, methyl, phenyl, tolyl, tert-butylphenyl, chlorophenyl, dichlorophenyl, methoxyphenyl, hydroxyphenyl, styryl, naphthyl, methoxynaphthyl, diphenylyl, acenaphthenyl, fluroenyl, pyrenyl, furoyl, bromofuroyl and benzfuroyl, and n is 1 or 2.

References Cited
UNITED STATES PATENTS
2,838,520  6/1958  Mueller et al. _____ 260—307
3,300,509  1/1967  Weber et al. _____ 260—307
2,765,304  10/1956  Siegrist _____ 260—307

FOREIGN PATENTS
896,219  5/1962  England _____ 260—240

OTHER REFERENCES
Grekov et al.: Zhur. Obsch. Khim., vol. 30, pp. 3240 to 3243 (1960).
Grekov et al.: Zhur. Obsch. Khim., vol. 31, pp. 407 to 411 (1961).
Nagornaya et al.: Chem. Abstracts, vol. 55, col. 18297 (1961).

JOHN D. RANDOLPH, Primary Examiner

U.S. Cl. X.R.

106—176; 117—33.5; 252—117, 152, 301.2; 260—256.4, 296, 307, 544, 558, 569